United States Patent
Lagache et al.

(10) Patent No.: US 11,369,124 B2
(45) Date of Patent: Jun. 28, 2022

(54) METHOD OF PREPARATION OF CHEWY CANDIES COMPRISING CRYSTALLINE ALLULOSE PARTICLES

(71) Applicant: ROQUETTE FRERES, Lestrem (FR)

(72) Inventors: Sylvie Lagache, Marcq en Baroeul (FR); Liuming Zhou, Geneva, IL (US)

(73) Assignee: ROQUETTE FRERES, Lestrem (FR)

( * ) Notice: Subject to any disclaimer, the term of this patent is extended or adjusted under 35 U.S.C. 154(b) by 204 days.

(21) Appl. No.: 16/079,261

(22) PCT Filed: Feb. 22, 2017

(86) PCT No.: PCT/EP2017/053970
§ 371 (c)(1),
(2) Date: Aug. 23, 2018

(87) PCT Pub. No.: WO2017/144486
PCT Pub. Date: Aug. 31, 2017

(65) Prior Publication Data
US 2019/0053512 A1    Feb. 21, 2019

(30) Foreign Application Priority Data

Feb. 23, 2016 (EP) .................................... 16305205

(51) Int. Cl.
| | |
|---|---|
| *A23G 3/38* | (2006.01) |
| *A23G 3/42* | (2006.01) |
| *A23G 3/34* | (2006.01) |
| *A23G 3/36* | (2006.01) |
| *A23G 3/48* | (2006.01) |
| *A23L 33/21* | (2016.01) |
| *A23L 29/212* | (2016.01) |

(52) U.S. Cl.
CPC ............. *A23G 3/38* (2013.01); *A23G 3/0006* (2013.01); *A23G 3/36* (2013.01); *A23G 3/42* (2013.01); *A23G 3/48* (2013.01); *A23L 29/212* (2016.08); *A23L 33/21* (2016.08); *A23V 2002/00* (2013.01)

(58) Field of Classification Search
CPC .......... A23G 3/0006; A23G 3/36; A23G 3/38; A23G 3/48; A23L 3/34
See application file for complete search history.

(56) References Cited

U.S. PATENT DOCUMENTS

| | | | |
|---|---|---|---|
| 2006/0257549 | A1 | 11/2006 | Overly et al. |
| 2016/0302463 | A1 † | 10/2016 | Woodyer |
| 2018/0271112 | A1 † | 9/2018 | Barkalow |

FOREIGN PATENT DOCUMENTS

| | | | |
|---|---|---|---|
| EP | 1 245 579 A1 | 10/2002 | |
| JP | 2014-138555 A | 7/2014 | |
| WO | 2015/075473 A1 | 5/2015 | |
| WO | WO-2015075473 A1 * | 5/2015 | ........... A23C 9/1307 |

OTHER PUBLICATIONS

May 12, 2017 International Search Report issued in International Patent Application No. PCT/EP2017/053970.
May 12, 2017 Written Opinion issued in International Patent Application No. PCT/EP2017/053970.

* cited by examiner
† cited by third party

*Primary Examiner* — Erik Kashnikow
*Assistant Examiner* — Assaf Zilbering
(74) *Attorney, Agent, or Firm* — Oliff PLC

(57) ABSTRACT

The present invention pertains to a method of preparation of chewy candies includes branched maltodextrins and crystalline allulose particles in such a way to maintain chewiness, to bring the "body" of the chew, to limit sandiness, to avoid hardening with time and to lower stickiness textures, and even in such a way to avoid cold flow.

9 Claims, No Drawings

METHOD OF PREPARATION OF CHEWY CANDIES COMPRISING CRYSTALLINE ALLULOSE PARTICLES

FIELD OF THE INVENTION

The present invention relates to confectionery products and more specifically pertains to a method of preparation of chewy candies.

BACKGROUND OF THE INVENTION

Preparation of Candies

Traditionally, the primary crystallizing ingredient in candy is sugar as sucrose.

It is so traditionally made of sucrose, glucose syrup, fat and gelatin. Turning the sugar into candy involves dissolving it in water, concentrating this solution through cooking, and subsequently allowing the mass either to form mutable solid or to recrystallize.

Key elements in the candy making process are in sugar's physical properties, specifically its solubility with its effect on the water's boiling point. At room temperature, about 2 kilos of sugar will dissolve in 1 kilo of water. At higher temperatures, more sugar can be dissolved in the same amount of water. Once dissolved, however, the sugar will raise the boiling point of the solution. The result of these physical chemistry properties is a specific relationship between the solution's boiling point and the amount of sugar solids contained therein.

The first part of basic candy making, therefore, is cooking a sugar solution to a specific temperature to form a supersaturated solution with known solids content.

When this solution cools, the sugar's solubility decreases and the sugar crystallizes out of solution.

The next part of making a candy is controlling how this recrystallization takes place. It is also known as graining.

Varying how the supersaturated syrup is physically treated while it cools controls recrystallization. Suspending a length of string into the solution and letting it slowly cool undisturbed will allow the sugar to recrystallize into large crystals on the string to form rock candy.

Cooling that same solution quickly with agitation will cause fine crystals to form and be suspended in saturated sugar syrup to become fondant. Fondant is used in confectionery crème centers. The sugar particle size could be as low as 10 μm.

Other variables can be introduced to control the size of the condense crystals and resulting to the mouthfeel/texture of the candies.

Variables might include seeding the solution with undissolved sugar crystals, changing the temperature at which agitation is begun, and adding invert sugar.

The size of the added crystals during seeding serves as a pattern for the crystal size in subsequent graining and allows the confectioners to control the finished particle size.

Undissolved sugar will also seed the solution, leading to undesirable crystal formation.

Allowing condensing steam to dissolve residual sugar can prevent this.

Temperature varying of the syrup when agitation begins allows a great deal of control over grain size.

To obtain larger crystals, agitation should begin at higher temperatures.

Smaller crystals are obtained by agitating at lower temperatures. The two extremes of this range of temperatures are usually avoided to prevent the finished candy being too gritty or lacking body.

Sucrose is a disaccharide consisting of one molecule each of glucose and fructose. Breaking this bond will yield a mixture of glucose and fructose monosaccharide known as invert sugar. When invert sugar is present in a batch of candy, it tends to reduce the grain size. At higher levels, the invert sugar can even prevent crystal formation to yield a mutable sugar glass such as hard candies. Adding invert sugar allows confectioners to include the exact amount needed to control crystallization. The desired amount of invert sugar can be obtained by using invert-containing ingredients such as glucose syrup.

Chewy Candies with chewy texture can be group into two basic types:

Ungrained candies that are candies in which the sugar isn't crystallized. These include hard candies, as well as chewy candies such as toffee and caramel.

Hard candies start with a basic sugar/glucose syrup blend cooked down to around 2% moisture and blended with flavors and colors. Varying the ratio of sweeteners produces different textures and different stability. Cooking the basic sugar/glucose syrup blend to a moisture level between 3 to 15% forms the basis of a chewy non-grained candy. Cooking to these higher moisture levels will not favor the production of invert sugar, as is the case with hard candies.

As a result, the addition of glucose syrup is critical to prevent undesired graining in chewy candies. The key is basic sugar/glucose syrup ratio. The more sugar crystals, the softer (initial bite) and grainier the candy is. The more glucose syrup it will be chewier and sticky. Caramels, on the other hand, require milk and more fat in the formula to provide flavor and color. In caramels, the Maillard reaction that goes on with the reducing sugars and milk proteins is important for developing both flavor and color. The higher the amount of reducing sugar (higher DE) Maillard reaction will speed up.

Grained candies that include products such as after-dinner mints, fondants/crème centers, and fudge. Grained candy formulas are similar to those of chewy candies. To promote crystallization, however, the formula must have a higher level of sugar solids and the process usually includes agitation.

The Choice of Sugar

Because of their taste and functional properties, the sugar like sucrose, invert sugar, glucose syrup and the like, were largely used for the preparation of such candies, However, it is known that excess intake of these nutritive sweeteners has long been associated with diet-related health issues, such as obesity, heart disease, metabolic disorders and dental problems.

Accordingly, consumers are increasingly looking for ways to decrease the amount of nutritive sweeteners in their diets.

So, there is a need for seeking to develop replacements for nutritive sweeteners that are better able to mimic the desirable taste and functional properties of the nutritive sweeteners, but which also has low or no calories.

The lower glycemic index of polyols (also named sugar alcohols), as compared to sugars such as sucrose and glucose, makes them suitable in the management of diabetes or in weight management.

Furthermore, the well-established dental benefits of using polyols, such as maltitol, xylitol, instead of conventional sweeteners, such as sucrose (e.g., dramatic reductions in new tooth decay, arrest and, in some instances, reversal of existing dental decay) make polyols desirable for use as alternative sweeteners.

It is for this reason that confectionery manufacturers have been led to develop sugar-free combinations in which polyols are rightly used because of their harmlessness towards the teeth and of their reduced calorific value compared with sucrose.

One of the great difficulties from which formulators of sugar-free confectionery products cannot escape is that of successfully manufacturing products which are in every respect similar to traditional products to the extent that it is difficult to tell them apart, this being without having to substantially alter or complicate the plants and the procedures in place in industries.

This is also true of the confectionery products which are the subject of the present invention.

Another difficulty is that literature on polyols demonstrates that, despite their many advantages, they may result in unpleasant side effects which include lower abdominal pain, bloating or even acute, non-infectious, non-inflammatory diarrhea. For this reason, some people, especially those with intestinal sensitivity, avoid candies containing polyols.

In document EP 1.245.579, of which the assignee is proprietor, it was proposed to reduce as much as possible the quantities of polyols to be used in the preparation of such confectionery products.

This was justified for reasons of a technical nature linked to ease of manufacture but also of an economic and metabolic nature, that is to say in particular of digestive tolerance.

Furthermore, it was particularly advantageous to limit as much as possible the incorporation of polyols which indeed contain fewer calories than sugar, but contain more calories than other bulking agents which may also enter into the formulation of such confectionery products, such that, if desired, a substantially higher calorie reduction can thus be obtained.

It was therefore found by the assignee that the combination of polysaccharides such as branched maltodextrins and certain polyols made it possible to prepare sugar-free confectionery products which are very well tolerated, optionally having a low calorific value, an excellent stability and an adaptable texture, at a rate of use, expressed relative to the sweetening mass present in confectionery products.

But in view of the above, it would be desirable to provide a low or zero calorie sweetener that is able to replace nutritive sweeteners directly, without the need for other components.

The concept is about "good for teeth", none polyol short texture chew.

Such sweetener should be able to be used in high amounts to provide the bulk, sweetening and functional properties of the nutritive sweeteners being replaced.

It has now been found that allulose can be used in food and beverage products at high levels to provide the required bulk, sweetening and functional properties.

D-allulose, also called D-psicose, has 70% of the relative sweetness of sucrose but a caloric value of 0.2 Kcal/g only.

It is a C-3 epimer of D-fructose, which belongs to "rare sugars". D-allulose can be produced from D-fructose by D-tagatose 3-epimerase (DTEase) family enzymes which have been found in various micro-organisms.

Moreover, D-allulose has been found to have a positive effect on the reduction of the glycemic response induced by the ingestion of maltose and sucrose (Matsuo T. et al., *J. Jpn. Soc. Nutr. Food Sci.* 2006; 59: 119-121).

It has already been proposed to use allulose syrup in the manufacture of candies (WO 2015/075473).

However, it remains the difficulty to make a crystallized allulose chew following the normal process established for sugar based chews.

Indeed, the technical problem is that, by using classical recipes and process, the chew becomes soft when hot (difficulty to process on chew lines), sticky and hard when cool (not complying with customer expectation). It is due to the high solubility of allulose, and its so low speed of crystallization. Besides, the classical process on chew lines even dissolves again the crystals brought through the seeding and there is no new crystal from the cooked saturated mass.

SUMMARY

This invention is thus directed to a method of preparation of chewy candies comprising allulose and soluble dietary fibers such as branched maltodextrin, polydextrose and fructooligosaccharides, more specifically of branched maltodextrins, in such a way to maintain chewiness, to bring the "body" of the chew, to limit sandiness, to avoid hardening with time and to lower stickiness textures, and even in such a way to avoid cold flow.

It pertains to a process for the manufacture of a chewy candy comprising branched maltodextrins and crystalline allulose particles, comprising the step of increasing the quantity of crystalline allulose seeds, lowering shear rate by using design of mixer limiting the residence time in mixers and lowering the temperature to avoid dissolution of crystals.

It also pertains to a double mixing stage that allows the saturated solution of Allulose to grow the existing crystals and disperse/grind them in the mass again.

DETAILED DESCRIPTION

The subject of the invention is therefore a process of preparation of a chewing candy comprising allulose and soluble dietary fiber, comprising:
  seeding a 40/60 to 60/40 ratio by weight of allulose and soluble dietary fiber blended in a mixer or a puller with 10 to 20% by weight with crystalline allulose particles below 100 µm, and
  mixing at a temperature between 20 to 45° C., preferably at 35° C., during 10 minutes to 30 minutes.

In the context of this description, "allulose" refers to D-allulose or L-allulose. However, D-allulose is preferred in the present invention, because it is easier to obtain.

By mean particle size is intended to refer to mean volume diameter D 4,3. Then, the crystalline allulose according to the invention preferably has mean volume diameter D 4,3 lower than 100 µm, preferably greater than 45 µm and lower than 100 µm.

The mean volume diameter D 4,3 of allulose is determined by means of a laser diffraction analyzer such as that marketed by BECKMAN-COULTER as "LS 230", equipped with its powder dispersion module (dry method), using the instructions for use provided by the supplier. The measurement range of the LASER diffraction granulometer type LS 230 is from 0.04 µm to 2000 µm. The operating conditions of hopper screw speed and intensity of vibration of the dispersion channel are determined in such a way that the optical concentration is between 4 percent and 12 percent, ideally 8 percent. The results are calculated as volume percent and expressed in µm.

Crystalline allulose may be prepared as follows.

A D-allulose syrup is first obtained by epimerization of D-fructose at C-3 catalyzed by an enzyme of the D-tagatose 3-epimerase family (DTEase, EC 5.1.3.-).

The raw material used for the epimerization may be crystalline fructose with a purity about 99%, for instance. It may be diluted with water to about 45% and magnesium chloride may be added thereto before enzymatic epimerization.

To date, at least five DTEases from different organisms have been characterized and employed for D-allulose synthesis. They are commercially available. A putative DTEase from *Agrobacterium tumefaciens* can also be used, and due to its high substrate specificity towards D-allulose, this enzyme was renamed as D-allulose (D-allulose) 3-epimerase (DPEase, EC 5.1.3.-). In an embodiment, the D-allulose 3-epimerase is selected from a D-tagatose 3-epimerase from *Pseudomonas cichorii*, a D-allulose 3-epimerase from *Agrobacterium tumefaciens*, a D-allulose 3-epimerase from *Clostridium* sp, a D-allulose 3-epimerase from *Clostridium scindens*, a D-allulose 3-epimerase from *Clostridium bolteae*, a D-allulose 3-epimerase from Ruminococcus sp, and a D-allulose 3-epimerase from *Clostridium cellulolyticum*.

In a preferred embodiment, the parent D-allulose 3-epimerase is a D-allulose 3-epimerase from *Clostridium cellulolyticum*, more particularly *Clostridium cellulolyticum* strain H10 (ATCC 35319). According to another embodiment, a variant of a parent D-psicose 3-epimerase is used, as described in WO 2015/032761.

The resulting allulose syrup may then be passed through microfiltration to remove any insoluble particles, then subjected to carbon filtration to remove its color, and then to a demineralization step on an ion exchange column to further remove minerals and other impurities. The syrup can then be concentrated using a conventional evaporator, for instance. This allulose syrup may further be subjected to an enrichment step by chromatography, for instance by passing it through a chromatographic simulated moving bed (SMB) with a calcium ion exchange resin. This syrup may be further concentrated before being crystallized. Crystallization may be carried out by cooling the concentrated allulose syrup following saturation curve. After crystallization, the crystal cake may be recovered by centrifugation and then washed. The resulting allulose crystals may then be dried.

The crystalline powdered allulose may further subjected to a grinding process in order to reduce its mean particle size to less than 250 µm, in case there are not enough particles below this mean particle size. Preferably, this grinding process is performed by continuous dry mechanical grinding. Numerous mills are available for such grinding, for instance mills equipped with blades or with rotor/stator, squirrel cage mills, oscillating, conical or cylindrical sieve mills, hammer mills and so on.

In the context of this description, "soluble dietary fibers" is understood to mean, for the purposes of the present inventions branched maltodextrin, indigestible dextrins, saccharide oligomers, polydextrose and fructooligosaccharides, more specifically of branched maltodextrins.

The expression "branched maltodextrins" is understood to mean, for the purposes of the present invention, the maltodextrins described in the document EP-A-1,006,128 and in its U.S. counterpart (U.S. Ser. No. 09/455,009), of which the assignee is proprietor. The branched maltodextrin could be technically replaced with any high molecular weight ingredient like glucose syrup, polyols syrup, gum arabic etc., but the goal was to create a good for teeth/polyols free concept. Thus branched maltodextrins were chosen.

For instance, the branched maltodextrins can be a commercially available product such as NUTRIOSE® FB06 (Roquette Freres).

The entire content of U.S. Ser. No. 09/455,009 is herein incorporated by reference. These branched maltodextrins have an indigestibility character which has the consequence of reducing their calorific value, by preventing their assimilation in the small intestine.

Their low content of molecules having a low degree of polymerization ("DP") also contributes to their low calorific value.

Their high content of 1->6 glucoside linkages has the consequence of reducing their cariogenic power by reducing their assimilation by the microorganisms of the buccal cavity.

This high level of 1->6 linkages also confers quite special prebiotic properties on them: it has indeed appeared that the bacteria of the caecum and of the colon in humans and animals, such as butyrogenic, lactic or propionic bacteria, metabolize highly branched compounds.

Moreover, these branched maltodextrins promote the development of bifidogenic bacteria to the detriment of undesirable bacteria.

This results in properties which are quite beneficial to the health of the consumer.

According to a preferred variant of the present invention, the said branched maltodextrins have a reducing sugar content of between 2 and 5% and a Mn of between 2000 and 3000 g/mol and may be completely or partially hydrogenated.

In the context of this description, "indigestible dextrins" is understood to mean, for the purposes of the present invention, the indigestible dextrins described in the documents EP 530.111 or U.S. Pat. No. 5,264,568.

In the context of this description, "saccharide oligomers" is understood to mean, for the purposes of the present invention, the saccharide oligomers described in the document WO 2008/085529 or WO 2009/051977.

According to the process of the invention, a 40/60 to 60/40 ratio by weight of allulose and soluble dietary fiber blended is seeded in a mixer or a puller with 10 to 20% by weight with crystalline allulose particles having a mean particle size below 100 µm, limiting mixing at a temperature between 20 to 45° C., preferably at 35° C. during 10 minutes to 30 minutes.

The assignee indeed found that in a normal recipe, with a ratio 55/45 of allulose/soluble dietary fiber (normally developed for the recipe containing sugar/glucose), seeded with 3 to 5% of crystalline allulose particles below 100 µm, mixed 30 minutes at 45° C. leads to the obtainment of a chew that becomes sticky and hard, with low chewiness.

On the strength of this fact, the applicant understand that the solubility of allulose is so high and the speed of crystallization so low that this process is "re-dissolving" the crystals brought through the seeding and not creating any new crystal from the cooked saturated mass.

To solve this problem, the process of the invention manages to avoid dissolution of crystals in the massecuite and to create some new ones by increasing the quantity of seeding, lowering shear rate by using another design of mixer or limiting the residence time in mixers, and lowering the temperature.

This process will allow having an "acceptable for customer" chewy texture, close to the standards on the market. It will help the manufacturing of this type of chew without having to invest in line big modification, keeping process time in standards, and even potentially shortening process times. This could be also used by chew and Chewing gum producers equipped with mixers or pullers.

The invention relates to a method of preparation of a chewing candy comprising allulose and soluble dietary fibers, comprising:
- seeding a 40/60 to 60/40 ratio by weight of allulose and soluble dietary fiber blended in a mixer or a puller with 10 to 20% by weight with crystalline allulose particles having a mean size below 100 µm, and
- mixing at a temperature between 20 to 45° C., preferably at 35° C., during 10 minutes to 30 minutes Optionally, before the step of seeding, allulose and soluble dietary fiber are blended and cooked up. Preferably, before the step of adding the crystalline allulose to the blended allulose and soluble dietary fiber, fat and optionally lecithin are added and the mixture is mixed. In particular, fat is present at a percentage of about 3-7% by weight of the total candy weight, preferably about 5%. Lecithin can be present at a percentage of about 0.1% by weight of the total candy weight.

For instance, the ratio by weight of allulose and soluble dietary fiber can 40/60, 45/55, 50/50, 55/45 or 60/40 or a combination of these ranges. In a preferred embodiment, the ratio by weight of allulose and soluble dietary fiber can 40/60, 45/55, or 50/50, more preferably about 45/55.

The percentage of crystalline allulose particles with a mean particle size below 100 µm can be 10% to 25% by weight of the total dry weight of the candy. More preferably, percentage of crystalline allulose particles is between 10 to 20%, still more preferably about 20%.

The seeding is done at a temperature of between 20 to 45° C., preferably of between 30 to 40° C., still more preferably of about 35° C.

In a most preferred embodiment, the seeding is done by adding crystalline allulose in several steps, preferably in two steps. For instance, at least one third is added in a first step and the remainder is added in a second step. Preferably, half is added in a first step and the remaining half is added in a second step. In a particular aspect, a gelatin solution is added to the mixture between the two steps of crystalline allulose addition. In particular, gelatin is present at a percentage of about 1% by weight of the total candy weight.

In a first embodiment, the seeding of allulose and soluble dietary fiber is done by adding crystalline allulose in two steps with a single mixing step of less than 30 minutes. The single step of mixing lasts between 10 and 25 minutes, preferably between 10 and 20 minutes, and more preferably about 20 minutes. The mixing step is carried out at a temperature of between 20 to 45° C., preferably of between 30 to 40° C., still more preferably of about 35° C. Preferably, the mixing step is carried out at the same temperature than the seeding step.

In a second embodiment, the seeding of allulose and soluble dietary fiber is done by adding crystalline allulose in two steps with two steps of mixing. The two steps of mixing last less than 30 minutes. The two steps can last the same period of time or can be different. Preferably, the first step of mixing is shorter than the second step of mixing. Alternatively, the first step of mixing is longer than the second step of mixing. In a preferred embodiment, the first step lasts 5 to 10 minutes, preferably about 10 minutes, and the second step lasts 10 to 20 minutes, preferably 10 minutes.

Flavor and/or citric acid can be added at any step. Preferably, the addition is performed after the crystalline allulose addition.

By "about" is intended to refer the value more or less 10% of the value, preferably more or less 5%. More instance, about 100 means between 90 and 110, preferably between 95 and 105.

EXAMPLES

This invention will be better understood in light of the following example which is given for illustrative purposes only and does not intend to limit the scope of the invention, which is defined by the attached claims.

Example 1

Three recipes are tested:
Recipe 1 as Control: seeding with Allulose: 3%

| % DS | Ingredient | % DS/TDS | % DS/Fp |
|---|---|---|---|
| 97 | NUTRIOSE ® FB06 from ROQUETTE FRERES | 41.89 | 39.59 |
| 99 | Allulose | 48.29 | 45.63 |
| 100 | Fat AAK Cebes 20 21 | 4.50 | 4.25 |
| 100 | Lecithin | 0.12 | 0.12 |
| 40 | Gelatin 150BI Gelita | 1.00 | 0.95 |
| 100 | Anhydrous Citric acid | 0.71 | 0.67 |
| 100 | Flavor | 0.49 | 0.46 |
| 99 | thin Allulose crystals (<100 µm) | 3.00 | 2.84 |
|  | Water | 0.00 | 5.5 |
|  | Total: | 100.00 | 100.00 |

Note:
DS = Dry solids
TDS = Total Dry Solids
Fp = Finished product

Preparation:

Add NUTRIOSE ® FB06 and allulose in the pan with water
Cook up to evaporate the required amount of water add fat (and lecithin)
mix strongly till all the fat is incorporated
cool on marble to 45° C.
add into Zarm mixer (jacketed at 45° C.) with the thin Allulose crystals
add the gelatin solution
run for 30 min with lead on
add flavor + acid, run for 1 min and empty Recipe 2: seeding with allulose 20% (two seeding steps) in single mixing

| % DS | Ingredient | % DS/TDS | % DS/Fp |
|---|---|---|---|
| 97 | NUTRIOSE ® FB06 | 41.89 | 39.59 |
| 99 | Allulose | 31.29 | 29.57 |
| 100 | Fat AAK Cebes 20 21 | 4.50 | 4.25 |
| 100 | Lecithin | 0.12 | 0.12 |
| 40 | Gelatin 150BI Gelita | 1.00 | 0.95 |
| 100 | Anhydrous Citric acid | 0.71 | 0.67 |
| 100 | Flavor | 0.49 | 0.46 |
| 99 | thin Allulose <100 µm | 20.00 | 18.90 |
|  | Water | 0.00 | 5.5 |
|  | Total: | 100.00 | 100.00 |

Preparation:

Add NUTRIOSE ® FB06 and allulose in the pan with water
cook up to evaporate the required amount of water
add fat (and lecithin), mix strongly till all the fat is incorporated in -continued the cooked mass
cool on marble down to 35° C.
add into Zarm mixer (jacketed at 35° C.) + ½ Allulose thin powder
add the gelatin solution
add the second half of the thin Allulose powder
run for 20 min with lead on
add flavor + acid, run for 1 min and empty Recipe 3: seeding with allulose 20% (two seeding steps) in double mixing

| % DS | Ingredient | % DS/TDS | % DS/Fp |
|---|---|---|---|
| 97 | NUTRIOSE ® FB06 | 41.89 | 39.59 |
| 99 | Allulose | 31.29 | 29.57 |
| 100 | Fat AAK Cebes 20 21 | 4.50 | 4.25 |
| 100 | Lecithin | 0.12 | 0.12 |
| 40 | Gelatin 150BI Gelita | 1.00 | 0.95 |
| 100 | Anhydrous Citric acid | 0.71 | 0.67 |
| 100 | Flavor | 0.49 | 0.46 |
| 99 | thin Allulose <100 µm | 20.00 | 18.90 |
|  | Water | 0.00 | 5.5 |
|  | Total: | 100.00 | 100.00 |

Preparation:

Add NUTRIOSE ® FB06 and allulose in the pan with water
cook up to evaporate the required amount of water
add fat (and lecithin), mix strongly till all the fat is incorporated in
the cooked mass
cool on marble down to 35° C.
add into Zarm mixer (35° C.) + ½ allulose thin powder
add the gelatin solution to facilitate the mixing
add ½ Allulose thin powder gradually
run for 10 min with lead on
add flavor + acid, run for 1 min and empty
empty the Zarm mixer and allow the dough to cool down and complete
crystallization (12 hours)
mix again the dough in the Zarm mixer for 10 to 20 min Each of the three recipes was tested for their stickiness, cold flow, sandiness, chewiness and hardness by a panel of 15 people.

The tests are carried out according to the standard AFNOR V 09-014 (April 1982) on recipes 1 to 3 per group of 5 or 6 samples per test.

The 5 or 6 samples were presented simultaneously, a different order of tasting being stipulated for each member of the panel.

The descriptor stipulated, namely the stick nature in the mouth, is evaluated on a 4-point scale graded in the following way: absence, slight, pronounced, very pronounced.

The analysis of variance (Friedman's ANOVA) distinguishes the samples with regard to their gritty natures ($p \ll 0.05$). The values obtained are shown in following table.

|  | Recipe 1 | Recipe 2 | Recipe 3 |
|---|---|---|---|
| Stickiness | very pronounced | pronounced | very slight |
| Cold flow | very pronounced | very pronounced | absence |
| Sandiness | absence | absence | very slight |
| Chewiness | very slight | very slight | pronounced |
| Hardness | pronounced | pronounced | very slight |

Conclusion:

The product of Recipe 1 is very sticky and shiny when warm, becomes hard with time, The product of Recipe 2 is sticky and a bit shiny when warm, becomes hard with time, The product of Recipe 3 is less sticky and mat, remains short texture with time. It has no cold flow.

The process of the invention by seeding with allulose particles in two steps maintains chewiness, avoids hardening with time and lowers stickiness textures. The use of a double mixing allows avoiding cold flow.

The invention claimed is:

1. Process of preparation of a chewing candy comprising allulose and soluble dietary fibers, comprising:
   providing or preparing a blend comprising a 40/60 to 60/40 ratio by weight of allulose and soluble dietary fiber blended in a mixer or a puller,
   after providing or preparing the blend, seeding the blend with 10 to 20% by weight of a total dry weight of the candy of crystalline allulose particles having a mean size below 100 µm, and
   mixing at a temperature between 20 and 45° C., during 10 minutes to 30 minutes.

2. Process according to claim 1, wherein the soluble dietary fiber is selected from the group consisting of branched maltodextrin, indigestible dextrins, saccharide oligomers, polydextrose and fructooligosaccharides.

3. Process according to claim 2, wherein the soluble dietary fiber is branched maltodextrins.

4. Process according to claim 1, wherein the seeding of the blend is done by adding crystalline allulose in two steps.

5. Process according to claim 1, wherein the seeding of the blend with crystalline allulose is done at a temperature of between 30 and 40° C.

6. Process according to claim 1, wherein the seeding of the blend is done by adding crystalline allulose in two steps with a single mixing step of less than 30 minutes.

7. Process according to claim 6, wherein the seeding of the blend is done by adding 20% allulose in two steps in single mixing in 20 minutes.

8. Process according to claim 1, wherein the seeding of the blend is done by adding crystalline allulose in two steps with two mixing steps of 10-20 minutes each and 20-30 minutes in total.

9. Process according to claim 8, wherein the seeding of the blend is done by adding, in total, 20% by weight of the total dry weight of the candy of crystalline allulose in two steps in double mixing of 10 minutes each.

* * * * *